United States Patent
Suzuki (10) Patent No.: US 12,412,207 B2
(45) Date of Patent: Sep. 9, 2025

(54) REGISTRATION APPARATUS AND CONTROL METHOD

(71) Applicant: TOSHIBA TEC KABUSHIKI KAISHA, Tokyo (JP)

(72) Inventor: Shigeaki Suzuki, Gotemba Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 527 days.

(21) Appl. No.: 17/859,327

(22) Filed: Jul. 7, 2022

(65) Prior Publication Data

US 2023/0162268 A1    May 25, 2023

(30) Foreign Application Priority Data

Nov. 22, 2021   (JP) ................. 2021-189098

(51) Int. Cl.
   *G06Q 20/00*   (2012.01)
   *G06Q 20/18*   (2012.01)
   *G06Q 20/20*   (2012.01)
   *G06Q 30/0601* (2023.01)

(52) U.S. Cl.
   CPC ......... *G06Q 30/0635* (2013.01); *G06Q 20/18* (2013.01); *G06Q 20/202* (2013.01)

(58) Field of Classification Search
   CPC ... G06Q 30/0635; G06Q 20/18; G06Q 20/202
   USPC ............................................ 705/16
   See application file for complete search history.

(56) References Cited

U.S. PATENT DOCUMENTS

2017/0300908 A1 * 10/2017 Ishikawa .............. G06Q 20/405

FOREIGN PATENT DOCUMENTS

| CN | 106934681 A | * | 7/2017 | ............. F25D 23/12 |
|---|---|---|---|---|
| CN | 107730242 A | * | 2/2018 | |
| CN | 109102662 A | * | 12/2018 | ........... G06K 7/1413 |
| EP | 3113129 A1 | * | 1/2017 | ............. G06Q 20/18 |
| EP | 3644289 A1 | * | 4/2020 | ............... A47F 9/04 |
| JP | 2010061658 A | * | 3/2010 | |
| JP | 2017130117 A | * | 7/2017 | ............. G06Q 20/20 |
| JP | 2019175517 A | * | 10/2019 | |
| JP | 2022131269 A | * | 9/2022 | ........... G02B 27/017 |
| JP | 2022139573 A | * | 9/2022 | ........... G06Q 10/087 |
| JP | 2022163452 A | * | 10/2022 | ......... G06Q 30/0627 |

* cited by examiner

*Primary Examiner* — Russell S Glass
(74) *Attorney, Agent, or Firm* — Kim & Stewart LLP (57) ABSTRACT

According to an embodiment, a registration apparatus includes a storage device that stores management information of a plurality of payment apparatuses. The registration apparatus selects a payment apparatus that performs payment processing for a purchased commodity from payment apparatuses corresponding to a designated payment method on the basis of the management information of the plurality of payment apparatuses, the management information being stored in the storage device.

9 Claims, 9 Drawing Sheets

| Payment apparatus ID | Corresponding method | Current status | | | Reservation status | |
|---|---|---|---|---|---|---|
| | | State | Transaction ID | Payment method | Transaction ID | Payment method |
| #01 | Cash payment | In execution | #1001 | Cash payment | | |
| #02 | Cash payment | In execution | #1002 | Cash payment | #1006 | Cash payment |
| #03 | Cash payment / Electronic payment | In execution | #1003 | Cash payment | | |
| #04 | Cash payment / Electronic payment | In execution | #1004 | Electronic payment | #1007 | Electronic payment |
| #05 | Electronic payment | In execution | #1005 | Electronic payment | | |

REGISTRATION APPARATUS AND CONTROL METHOD

CROSS-REFERENCE TO RELATED APPLICATIONS

This application is based upon and claims the benefit of priority from the prior Japanese Patent Application No. 2021-189098, filed on Nov. 22, 2021, the entire contents of which are incorporated herein by reference.

FIELD

An embodiment described herein generally relates to a registration apparatus and a control method for a registration apparatus.

BACKGROUND

Conventionally, in stores such as supermarkets and mass retailers, a system in which registration processing for a commodity to be purchased by a customer and payment processing for the commodity registered in the registration processing are performed by different apparatuses has been adopted. For example, in a system called semi-self-service system, a registration apparatus that executes registration processing in accordance with an operation of a clerk and a payment apparatus that executes payment processing for a commodity registered by the registration apparatus through an operation of a customer are used. Further, in recent years, a system in which registration processing is performed by a mobile terminal operated by a customer, and payment processing is performed using a payment apparatus installed in a store has also been employed.

In addition, electronic payments such as credit card payment, electronic money payment, and code payment are also used as payment methods other than cash payment.

Incidentally, in the above-mentioned semi-self-service system or the like, if there are a plurality of payment apparatuses, a clerk selects one payment apparatus to be used from among those payment apparatuses. For example, there has been conventionally proposed a technique in which a button capable of selecting each of a payment method and a payment apparatus is displayed on a screen of the registration apparatus, and the payment method and payment information are transmitted to the payment apparatus selected by a user or a clerk.

However, in the related art, while the payment information can be transmitted to the selected payment apparatus, there is room for further improvement in the method of selecting the payment apparatus. For example, the time and effort required for accounting operations differ between cash payment and electronic payment, and the time required for accounting operations in cash payment tends to be longer than in electronic payment. Hence, selecting the payment apparatus in consideration of the payment method makes it possible to improve the processing efficiency.

DETAILED DESCRIPTION

According to one embodiment, a registration apparatus is included in a checkout system including a plurality of payment apparatuses for performing payment processing for a commodity purchased according to a predetermined payment method on the basis of payment information of the commodity purchased by a customer, and provides the payment information to one of the plurality of payment apparatuses. The registration apparatus includes a storage device, an input device, a reception device, and a controller. The storage device stores management information of the plurality of payment apparatuses. The input device inputs a commodity code for specifying the purchased commodity. The reception device receives a designation of the payment method. The controller specifies a commodity corresponding to the commodity code input by the input device and registers sales data indicating contents relating to a transaction of the specified commodity. The controller selects a payment apparatus that performs payment processing for the purchased commodity from payment apparatuses corresponding to the designated payment method received by the reception device on the basis of the management information of the plurality of payment apparatuses, the management information being stored in the storage device. The controller generates payment information of the purchased commodity on the basis of the registered sales data. Further, the controller outputs the generated payment information to the selected payment apparatus.

Hereinafter, an embodiment will be described in detail with reference to the drawings. Note that in the drawings the same reference numerals denote the same or similar parts. In addition, the present invention is not limited by the embodiment to be described below.

Figure 1:
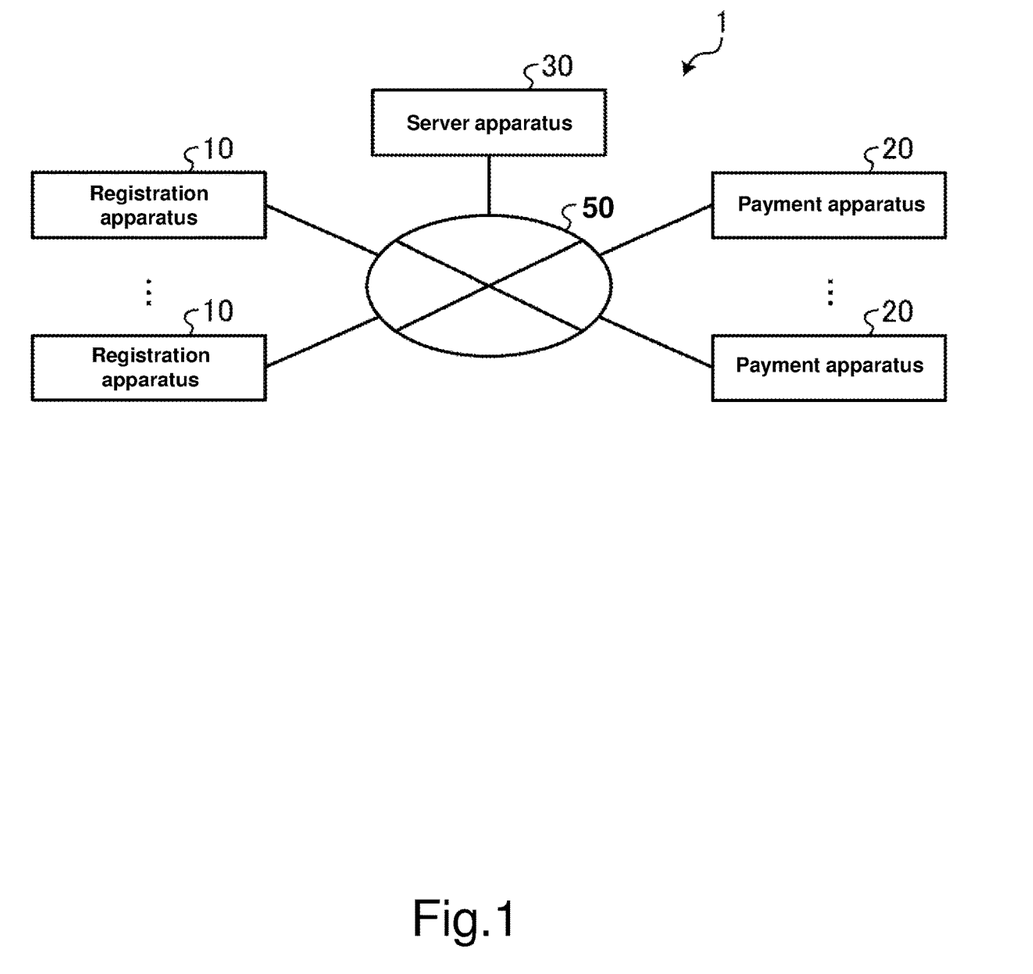
FIG. 1 is a diagram showing an example of a configuration of a checkout system according to an embodiment.

FIG. 1 is a diagram showing an example of a configuration of a checkout system according to an embodiment. As shown in FIG. 1, the checkout system 1 includes a registration apparatus 10, a payment apparatus 20, and a server apparatus 30.

The registration apparatus 10, the payment apparatus 20, and the server apparatus 30 are communicably connected to each other via a wired or wireless network 50. The number of registration apparatuses 10 and payment apparatuses 20 connected to the network 50 is not particularly limited, and a plurality of payment apparatuses 20 are provided in this embodiment.

Figure 2:
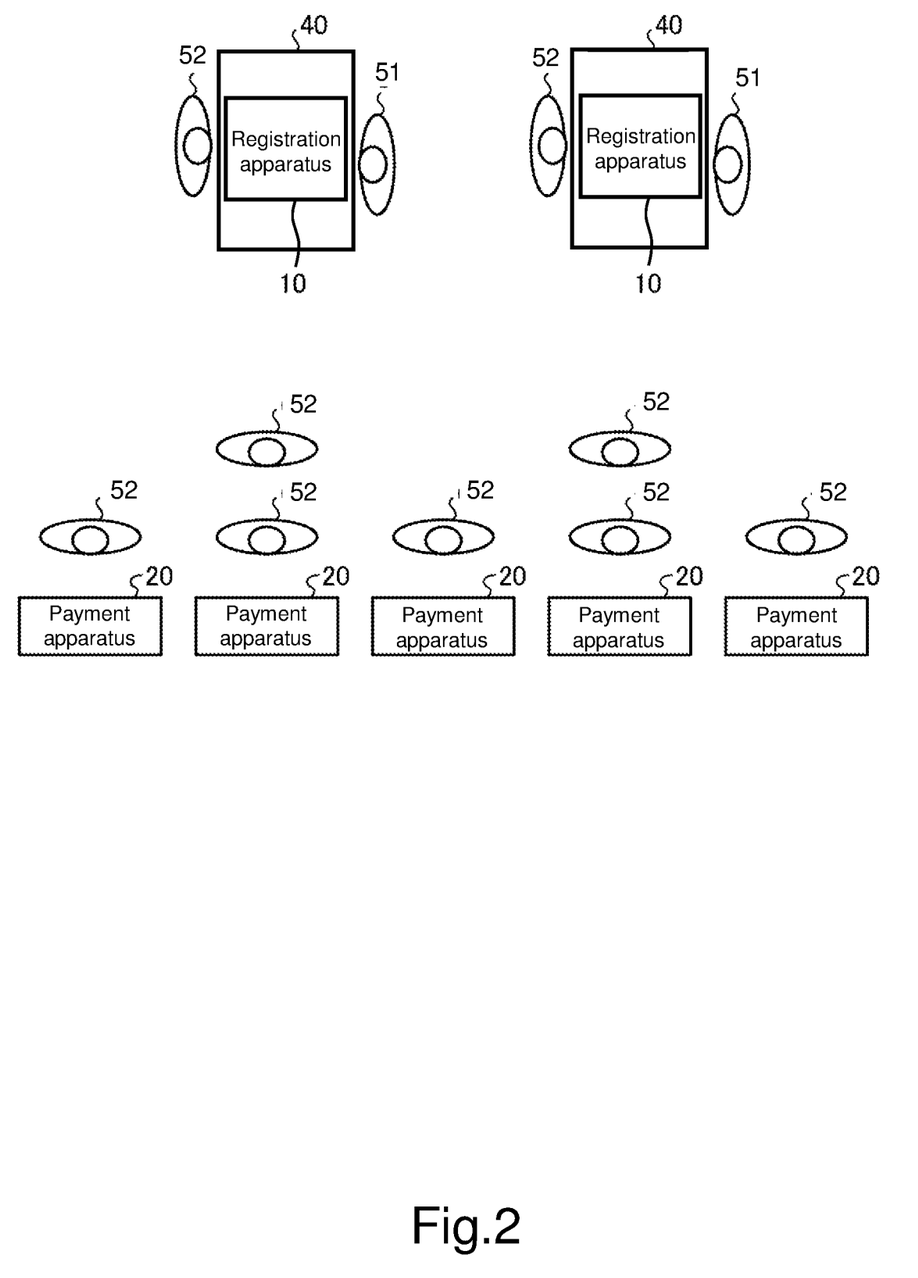
FIG. 2 is a diagram showing an example of a layout of registration apparatuses and payment apparatuses according to the embodiment that are arranged in a store according to the embodiment.

The registration apparatus 10 and the payment apparatus 20 are arranged in an area where checkout (registration and payment) of commodities is performed (see FIG. 2) in a store such as a supermarket or a mass retailer, and provide a checkout (registration and payment) system called semi-self-service system, for example. FIG. 2 is a diagram showing an example of the layout of the registration apparatuses 10 and the payment apparatuses 20 arranged in the store.

The registration apparatus 10 is installed on, for example, a table-like worktable 40. The registration apparatus 10 is operated by a clerk 51 to perform registration processing for commodities to be purchased by a customer 52. The payment apparatus 20 is operated by the customer 52 to perform payment processing for the commodities registered by the registration apparatus 10. In this case, it is favorable that the number of payment apparatuses 20 is equal to or larger than the number of registration apparatuses 10.

In the layout of FIG. 2, the customer 52 who will purchase commodities puts commodities in a shopping basket or the like and carries the commodities to the registration apparatus 10. The clerk 51 of the registration apparatus 10 uses a reading device such as a barcode scanner to input a commodity code, with which each commodity can be identified, from a barcode or the like attached to the commodity to the registration apparatus 10, thus sequentially registering the commodities. When the registration of the commodities is completed, the registration apparatus 10 delivers payment information for paying for the registered commodities to the payment apparatus 20 to be a payment destination of the commodities (hereinafter, also referred to as an accounting destination).

On the other hand, when the registration of the commodities is completed by the registration apparatus 10, the customer 52 moves the commodities, i.e., shopping basket, to the payment apparatus 20 of the accounting destination. The customer 52 then operates the payment apparatus 20 to cause the payment apparatus 20 to execute payment processing based on the payment information. As described above, since the registration and the accounting can be separated in the semi-self-service system, the processing efficiency such as shortening a checkout waiting time or the like can be achieved.

Referring back to the description of FIG. 1, the server apparatus 30 is a server apparatus such as a store server. The server apparatus 30 stores and manages various types of information relating to checkout. For example, the server apparatus 30 stores and manages a commodity master 3502, a member master 3503, a payment apparatus management file 3504, and the like, which will be described later (see FIG. 3).

Next, the configuration of each of the above-mentioned apparatuses will be described. Hereinafter, for convenience of description, the server apparatus 30, the registration apparatus 10, and the payment apparatus 20 will be described in this order.

Figure 3:
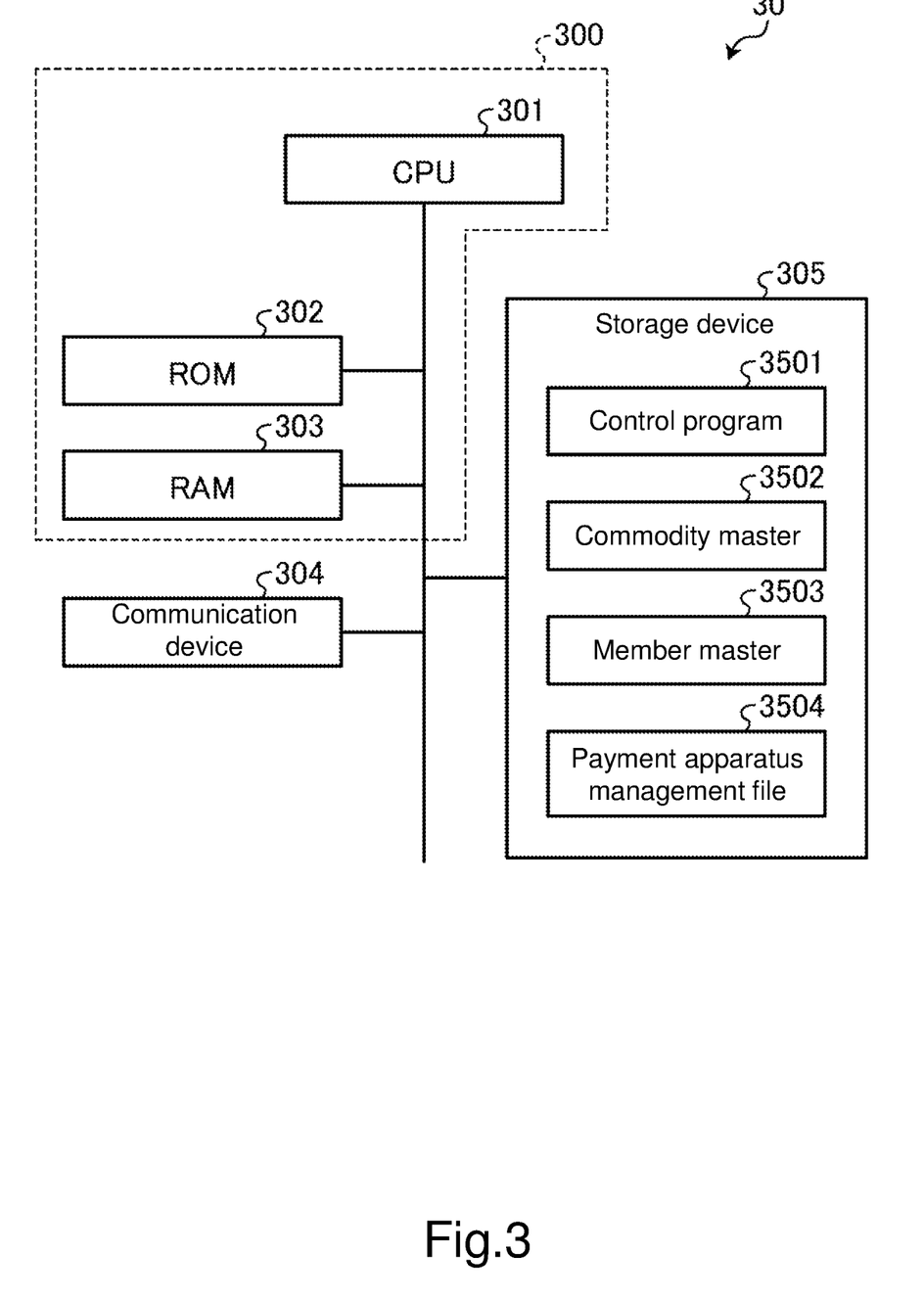
FIG. 3 is a diagram showing an example of a hardware configuration of a server apparatus according to the embodiment.

First, the configuration of the server apparatus 30 will be described. FIG. 3 is a diagram showing an example of a hardware configuration of the server apparatus 30. As shown in FIG. 3, the server apparatus 30 includes a central processing unit (CPU) 301, a read only memory (ROM) 302, and a random-access memory (RAM) 303.

The CPU 301 is an exemplary processor and comprehensively controls the operation of the server apparatus 30. The ROM 302 stores various programs. The RAM 303 is a workspace for expanding programs and various types of data. The CPU 301, the ROM 302, and the RAM 303 are connected to each other via a bus or the like to form a controller 300 of the computer. In the controller 300, the CPU 301 executes various types of processing by operating in accordance with a control program 3501 stored in the ROM 302 or a storage device 305 and expanded in the RAM 303.

The controller 300 is connected to a communication device 304 and the storage device 305 via a bus or the like. The communication device 304 is a communication interface connectable to the network 50. The communication device 304 communicates with external apparatuses such as the registration apparatus 10 and the payment apparatus 20 via the network 50.

The storage device 305 includes a hard disk drive (HDD), a flash memory, and the like and maintains stored contents even when the power is turned off. The storage device 305 stores, for example, the control program 3501, the commodity master 3502, the member master 3503, and the payment apparatus management file 3504.

The control program 3501 is a control program for controlling the operation of the server apparatus 30. The commodity master 3502 stores the commodity information of commodities sold in the store in association with the commodity code of each of the commodities, for example. Here, the commodity code is an example of a commodity identifier with which the type of commodity can be identified (specified). The commodity information includes information on a commodity, such as the commodity name and unit price of a corresponding commodity. The member master 3503 stores member information of the member in association with a member code of a customer who has done member registration (hereinafter, also referred to as member). Here, the member code is an example of a user identifier with which each member can be identified. The member information includes information on a member, e.g., the name, age, and contact information such as e-mail address of a corresponding member.

The payment apparatus management file 3504 is a storage area or data file for managing the status of the payment apparatus 20. Specifically, the payment apparatus management file 3504 stores and manages a payment method that can be handled by each payment apparatus 20, a processing status of the payment processing performed by the payment apparatus 20, and the like.

Figure 4:
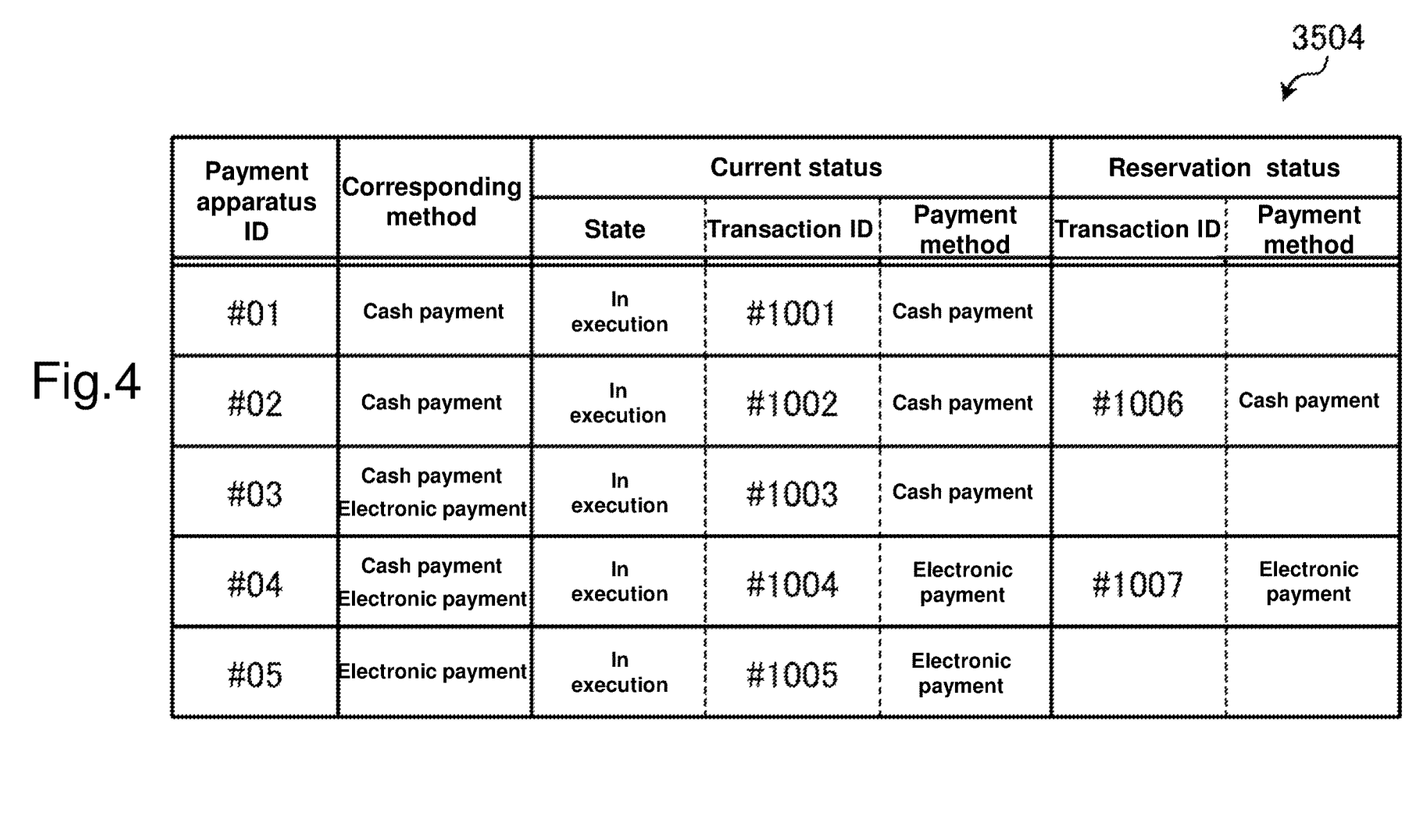
FIG. 4 is a diagram showing an example of a data structure of a payment apparatus management file according to the embodiment.

FIG. 4 is a diagram showing an example of the data structure of the payment apparatus management file 3504. As shown in FIG. 4, the payment apparatus management file 3504 stores a corresponding method, a current status, a reservation status, and the like in association with a payment apparatus ID for identifying each payment apparatus 20.

Here, the item of the corresponding method is to show a payment method that can be handled by the payment apparatus 20 corresponding to the payment apparatus ID. Examples of the payment method include electronic payments using a credit card, electronic money, a two-dimensional code, and the like, in addition to a cash payment method (cash).

The example of FIG. 4 shows that, among the five payment apparatuses 20 with the payment apparatus IDs #01 to #05, the payment apparatuses 20 with #01 and #02 are the payment apparatuses 20 exclusively for cash payment, the payment apparatuses 20 with #03 and #04 are the payment apparatuses 20 for both cash payment and electronic payment, and the payment apparatus 20 with #05 is the payment apparatus 20 exclusively for electronic payment.

Note that the information stored in the "corresponding method" column is not limited to the example of FIG. 4. For example, the "corresponding method" column may store payment methods obtained by subdividing the types of electronic payment such as credit card payment, electronic money payment, and code payment in accordance with the functions of the payment apparatus 20. Further, the "corresponding method" column may store payment methods subdivided for each company providing the electronic payment service and for each type of services.

Information indicating the processing status of the payment apparatus 20 is stored in the items of the current status and the reservation status. Here, the item of the current status indicates the current status of the payment apparatus 20 corresponding to the payment apparatus ID. The item of the current status stores, for example, whether or not the payment apparatus 20 is executing payment processing, and if it is executing, details of the payment processing.

As an example, the "current status" column stores a state indicating whether the payment processing is being executed or standby, and the like. Note that if the payment processing is being executed, it is favorable to hold a transaction ID relating to the payment processing being executed, the payment method used in the payment processing, and the like together, as shown in FIG. 4. As a result, by referring to the "current status" column, it is possible to easily confirm whether or not each of the payment apparatuses 20 is executing the payment processing, and if the payment processing is being executed, easily confirm the payment method to be used.

The example of FIG. 4 indicates that, among the five payment apparatuses 20 with the payment apparatus IDs #01 to #05, the payment apparatuses 20 with #01 to #03 are executing the payment processing by cash. The example of FIG. 4 also indicates that the payment apparatuses 20 with #04 and #05 are executing the payment processing by electronic payment.

Note that the information stored in the "current status" column is not limited to the example of FIG. 4. For example, a status indicating use prohibition such as failure, the remaining amount of change, and the like may be stored as the status of the payment apparatus 20.

The item of the reservation status indicates the status of the unprocessed payment information allocated to the payment apparatus 20 corresponding to the payment apparatus ID, i.e., an allocation status. In other words, the item of the reservation status stores the status of payment processing to be executed by the payment apparatus 20.

As an example, in the "reservation status" column, a transaction ID with which a transaction relating to the payment information allocated to the payment apparatus 20 can be identified and a payment method to be used in the transaction are stored in association with each other. The transaction ID stored in the reservation status is subjected to payment processing in the payment apparatus 20 through the operation of the customer or the like after the preceding payment processing (payment processing in the "current status" column) is completed in the corresponding payment apparatus 20. The transaction ID relating to the newly executed payment processing is moved to the "current status" column and deleted from the "reservation status" column. In other words, by referring to the "reservation status" column, it is possible to confirm the number of pieces of payment processing to be processed by the payment apparatus 20 and its payment method.

The example of FIG. 4 indicates that, among the five payment apparatuses 20 with the payment apparatus IDs of #01 to #05, one transaction (cash payment) is scheduled to be allocated to the payment apparatus 20 with #02 and one transaction (electronic payment) is scheduled to be allocated to the payment apparatus 20 with #04.

Note that the information stored in the "reservation status" column is not limited to the example of FIG. 4. For example, the number of pieces of payment information allocated to the payment apparatus 20 for each payment method may be stored as the reservation status.

The controller 300 implements various types of processing and functions by cooperating with the control program 3501. For example, the controller 300 provides the commodity master 3502, the member master 3503, and the payment apparatus management file 3504 stored in the storage device 305 in a state capable of being referred to by the registration apparatus 10 and the payment apparatus 20.

Further, for example, the controller 300 updates the payment apparatus management file 3504 in response to the notification from the registration apparatus 10 and the payment apparatus 20. For example, when receiving an allocation notification instructing a transaction ID, a payment method, and a payment apparatus ID from the registration apparatus 10, the controller 300 registers the transaction ID and the payment method instructed by the allocation notification in association with each other in the "reservation status" column relating to the payment apparatus ID.

Further, for example, when receiving a payment processing start notification instructing the transaction ID from the payment apparatus 20, the controller 300 confirms whether or not the instructed transaction ID exists in the "reservation status" column of the payment apparatus ID corresponding to the payment apparatus 20 of the notification source. If the instructed transaction ID exists in the "reservation status" column, the controller 300 moves the information (transaction ID, payment method) corresponding to the transaction ID to the "current status" column, and updates the "current status" column to the state of being executed.

Note that, in response to the start notification, the controller 300 may transmit a payment method corresponding to the instructed transaction ID to the payment apparatus 20. Further, if the instructed transaction ID does not exist in the "reservation status" column, the controller 300 may transmit an error notifying that the payment apparatus 20 of accounting destination is incorrect. In this case, the controller 300 may specify a payment apparatus ID, the instructed transaction ID of which is registered in the "reservation status" column, from the payment apparatus management file 3504 and may transmit the specified payment apparatus ID as the correct accounting destination to the payment apparatus 20 of the notification source.

Further, for example, when receiving a payment processing end notification from the payment apparatus 20, the controller 300 updates the "current status" column of the payment apparatus ID corresponding to the payment apparatus 20 of the notification source to a standby state.

Further, for example, the controller 300 may acquire the payment information together with the allocation notification from the registration apparatus 10. In this case, the controller 300 stores and manages the payment information transmitted from the registration apparatus 10 in the storage device 305 or the like in association with the transaction ID. When the start notification is notified from the payment apparatus 20, the controller 300 updates the "current status" column relating to the payment apparatus 20, reads the payment information corresponding to the indicated transaction ID from the storage device 305 or the like, and transmits the payment information to the payment apparatus 20. Note that the transaction ID associated with the payment information may be included in the allocation notification or may be included in the payment information itself.

Figure 5:
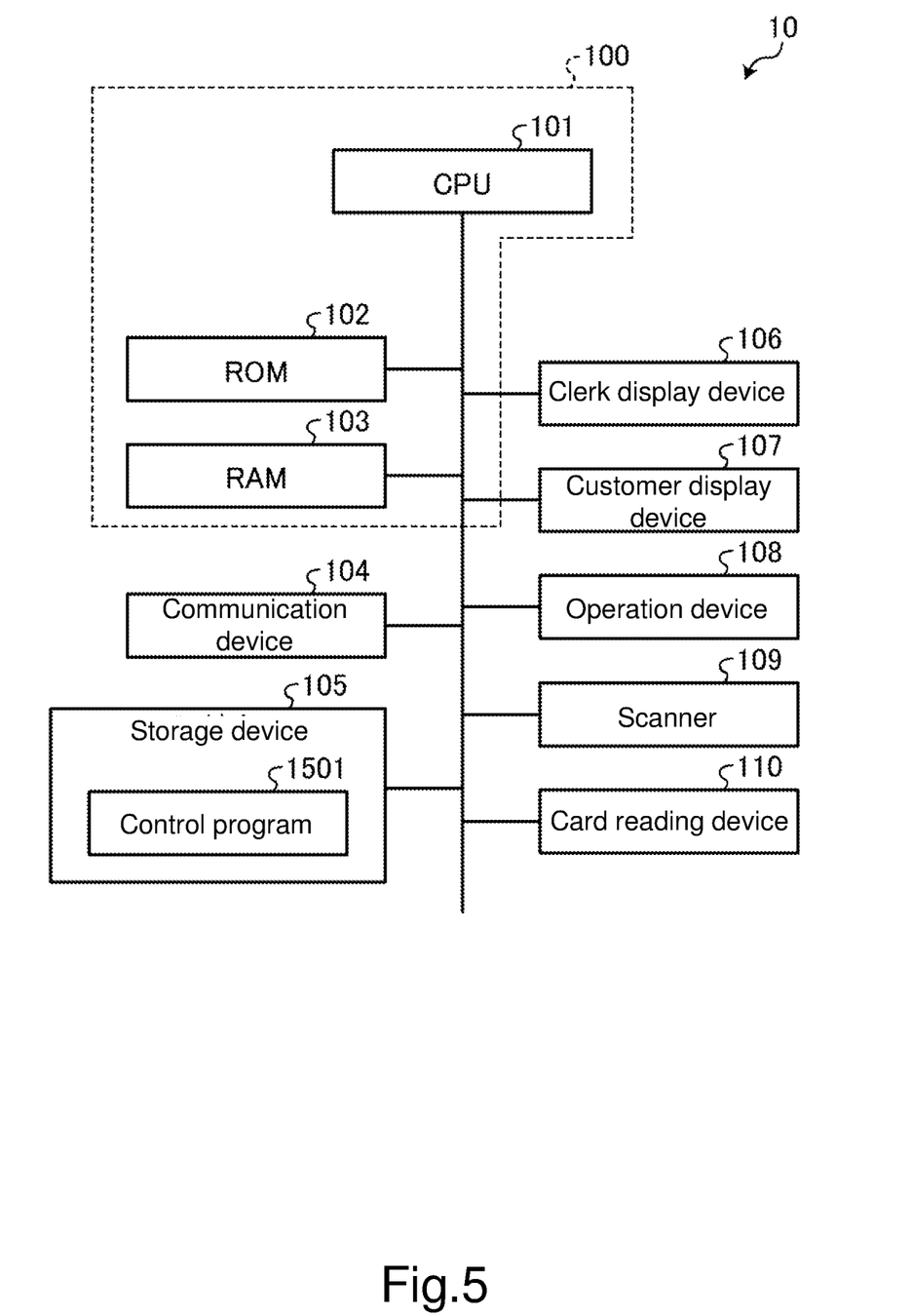
FIG. 5 is a diagram showing an example of a hardware configuration of the registration apparatus according to the embodiment.

Next, the configuration of the registration apparatus 10 will be described. FIG. 5 is a diagram showing an example of the hardware configuration of the registration apparatus 10. As shown in FIG. 5, the registration apparatus 10 includes a CPU 101, a ROM 102, and a RAM 103.

The CPU 101 is an exemplary processor and comprehensively controls the operation of the registration apparatus 10. The ROM 102 stores various programs. The RAM 103 is a workspace for expanding programs and various types of data. The CPU 101, the ROM 102, and the RAM 103 are connected to each other via a bus or the like to form a controller 100 of the computer. In the controller 100, the CPU 101 executes various types of processing by operating in accordance with a control program 1501 stored in the ROM 102 or the storage device 105 and expanded in the RAM 103.

The controller 100 is connected to a communication device 104 and the storage device 105 via a bus or the like. The communication device 104 is a communication interface connectable to the network 50. The communication device 104 communicates with external apparatuses such as the payment apparatus 20 and the server apparatus 30 via the network 50.

The storage device 105 includes an HDD, a flash memory, and the like, and maintains stored contents even when the power is turned off. The storage device 105 stores, for example, the control program 1501.

The control program 1501 is a control program for controlling the operation of the registration apparatus 10. Note that the storage device 105 may store the above-mentioned commodity master 3502 provided from the server apparatus 30, and the like.

Further, the controller 100 is connected with a clerk display device 106, a customer display device 107, an operation device 108, a scanner 109, a card reading device 110, and the like via a bus or the like.

The clerk display device 106 is a display/operation device such as a touch panel disposed for a clerk who operates the registration apparatus 10. The customer display device 107 is a display/operation device such as a touch panel disposed for a customer. The clerk display device 106 and the customer display device 107 display various types of information under the control of the controller 100.

The operation device 108 includes various operation buttons such as a number key and a closing key, and outputs key information corresponding to the operation of the operator to the controller 100. The operation device 108 may include touch panels of the clerk display device 106 and the customer display device 107.

The scanner 109 is a reading device capable of reading a code symbol such as a bar code or a two-dimensional code. For example, the scanner 109 reads the commodity code from the code symbol attached to a commodity and outputs the read commodity code to the CPU 101.

Figure 6:
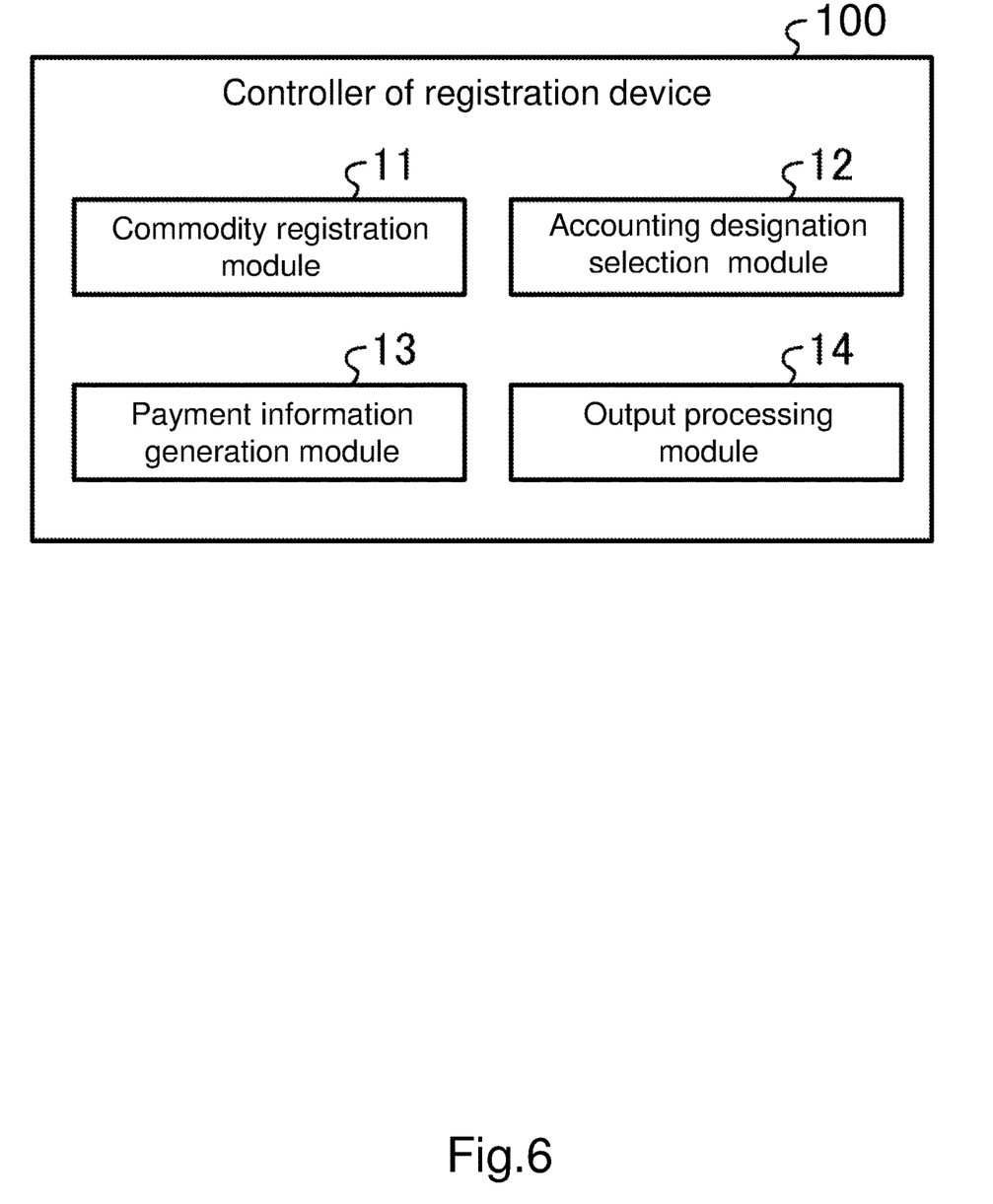
FIG. 6 is a diagram showing an example of a functional configuration of the registration apparatus according to the embodiment.

The card reading device 110 is a reading device that reads information from a card medium such as a magnetic card or an IC card. For example, the card reading device 110 reads user identification information such as a member ID from a card medium (e.g., a member card) owned by the customer, and outputs the read user identification information to the CPU In the configuration of the registration apparatus 10 described above, the controller 100 implements functional units for executing various types of processing by cooperating with the control program 1501. FIG. 6 is a diagram showing an example of the functional configuration of the registration apparatus 10.

As shown in FIG. 6, the controller 100 of the registration apparatus 10 executes the control program 1501 to implement a commodity registration module 11, an accounting destination selection module 12, a payment information generation module 13, and an output processing module 14 as functional units.

The commodity registration module 11 is an example of registration means. The commodity registration module 11 executes registration processing for a commodity to be purchased by a customer. Specifically, the commodity registration module 11 acquires the commodity code input from the operation device 108 and the scanner 109 as commodity identification information. Next, the commodity registration module 11 specifies a commodity corresponding to the acquired commodity code from the commodity master 3502. The commodity registration module 11 then registers the sales data of the specified commodity, the sales data indicating the contents relating to the commercial transaction.

For example, the commodity registration module 11 acquires commodity information of the specified commodity from the commodity master 3502. Next, the commodity registration module 11 associates the acquired commodity information with the number of commodities separately input (the number of purchases), and generates them as sales data. The commodity registration module 11 then stores the generated sales data in the RAM 103, the storage device 105, or the like, thus registering the commodity.

The accounting destination selection module 12 is an example of reception means, selection means, and notification means. The accounting destination selection module 12 selects a payment apparatus 20 to be an accounting destination on the basis of the payment method desired by the customer.

Specifically, the accounting destination selection module 12 receives a designation of the payment method desired by the customer from among payment methods that can be handled by the respective payment apparatuses 20. Here, the payment methods that can be handled by the payment apparatuses 20 can be specified by referring to the "corresponding method" column of the payment apparatus management file 3504 (see FIG. 4).

In addition, various forms are possible regardless of the method of receiving the payment method. For example, the accounting destination selection module 12 may display an operation screen (hereinafter, a payment method selection screen) for designating (or selecting) a payment method on the clerk display device 106 or the customer display device 107, thereby receiving an operation of designating a payment method from the clerk or the customer. In this embodiment, a form in which a designation of the payment method desired by the customer is received via the payment method selection screen displayed on the customer display device 107 will be described.

Figure 7:
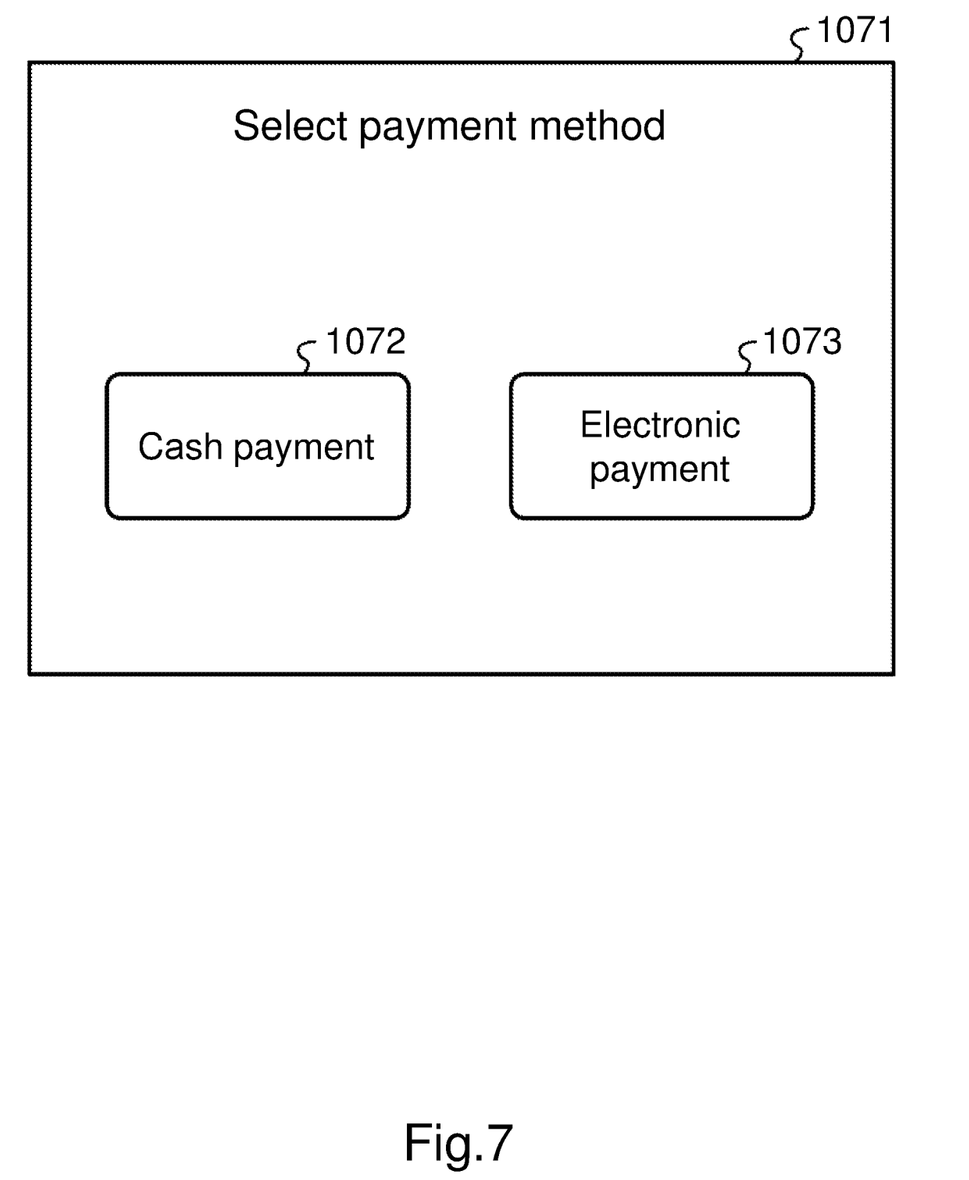
FIG. 7 is a diagram showing an example of a payment method selection screen displayed on a customer display device according to the embodiment.

FIG. 7 is a diagram showing an example of the payment method selection screen displayed on the customer display device 107. As shown in FIG. 7, an operation button 1072 for selecting cash payment and an operation button 1073 for selecting electronic payment are displayed on the payment method selection screen 1071. When the operation button 1072 is operated, the accounting destination selection module 12 accepts cash payment as the payment method desired by the customer. When the operation button 1073 is operated, the accounting destination selection module 12 accepts electronic payment as the payment method desired by the customer. If the payment method that can be handled by the payment apparatus 20 is subdivided, it is favorable that options displayed on the payment method selection screen 1071 are also subdivided and displayed.

When the payment method is designated, the accounting destination selection module 12 selects the payment apparatus 20 to be the accounting destination from the payment apparatuses 20 corresponding to the designated payment method. Specifically, the accounting destination selection module 12 refers to the "corresponding method" column of the payment apparatus management file 3504, and extracts the payment apparatuses 20 corresponding to the designated payment method. The accounting destination selection module 12 then selects one payment apparatus 20 to be the accounting destination from the extracted payment apparatuses 20.

Here, various methods can be employed for selecting the payment apparatus 20. For example, the accounting destination selection module 12 refers to the "current status" column and the "reservation status" column of the extracted payment apparatus 20, and preferentially selects the payment apparatus 20 with fewer users. As an example, the accounting destination selection module 12 preferentially selects the payment apparatus 20 in which the "current status" column is in standby or the "reservation status" column is empty. Further, for example, if the "current status" column is "in execution" in any of the payment apparatuses 20, the accounting destination selection module 12 preferentially selects the payment apparatus 20 having the smallest number of transaction IDs registered in the "reservation status" column.

Further, for example, if the designated payment method is electronic payment and if the extracted payment apparatuses 20 include a payment apparatus 20 that handles cash payment and electronic payment and a payment apparatus 20 exclusively for electronic payment, it is favorable that the accounting destination selection module 12 preferentially selects the payment apparatus 20 exclusively for electronic payment. Since the time and effort required for accounting operations differs between cash payment and electronic payment, the time required for payment processing in cash payment tends to be longer than in electronic payment. Hence, if the payment method is electronic payment, the payment processing is performed by the payment apparatus 20 exclusively for electronic payment, so that the processing efficiency thereof can be improved as a whole as compared with the payment processing performed by the payment apparatus 20 corresponding to both electronic payment and cash payment.

Further, it is favorable that the accounting destination selection module 12 selects the payment apparatus 20 to be the accounting destination on the basis of the payment method of the payment processing being executed or scheduled to be executed by the extracted payment apparatus 20.

For example, if the designated payment method is cash payment and if the extracted payment apparatuses 20 include a plurality of payment apparatuses 20 that handle cash payment and electronic payment, the accounting destination selection module 12 preferably reduces the priority of the payment apparatus 20 that is executing or is scheduled to execute the payment processing by cash payment to select a payment apparatus 20 as an accounting destination. As a result, the processing efficiency of the payment apparatus 20 as a whole can be improved.

In addition, the payment apparatus 20 may be selected on the basis of other conditions relating to the payment apparatus 20. For example, if the distance between the registration apparatus 10 and the payment apparatus 20 is registered in the payment apparatus management file 3504 or the like, the accounting destination selection module 12 may preferentially select the payment apparatus 20 that is closer to the registration apparatus 10 in which the commodity registration has been performed. Further, for example, if the remaining amount of money (hereinafter, also referred to as stock) for each denomination stored in a depositing/dispensing device 209 of the payment apparatus 20 is registered in the payment apparatus management file 3504 or the like, and if the designated payment method is cash payment, the accounting destination selection module 12 may preferentially select the payment apparatus 20 with a large stock.

The various conditions for selecting the payment apparatus 20 described above (hereinafter, also referred to as selection conditions) may be used alone or may be used in combination. In addition, the selection conditions are not limited to the examples described above.

Note that in this embodiment the accounting destination selection module 12 automatically selects (determines) the payment apparatus 20 of the accounting destination, but it may be configured to present selection candidates and allow the clerk or the customer to select them. For example, the accounting destination selection module 12 may cause the clerk display device 106 to display an operation screen in which options representing the extracted payment apparatuses 20 are arranged in the order of priority based on the selection conditions described above to prompt the clerk to perform selection. In this case, the accounting destination selection module 12 selects the payment apparatus 20 selected via the operation screen as the accounting destination.

When selecting the payment apparatus 20 as the accounting destination, the accounting destination selection module 12 displays the payment apparatus ID of the selected payment apparatus 20 on the clerk display device 106 and the customer display device 107 to notify the payment apparatus 20 of the accounting destination. At this time, the accounting destination selection module 12 may cause the customer display device 107 to display a screen for guiding the position of the payment apparatus 20 of the accounting destination.

Note that the timing at which the accounting destination selection module 12 receives the payment method and selects the payment apparatus 20 is not particularly limited. For example, the accounting destination selection module 12 may display the payment method selection screen 1071 at the start of the commodity registration to receive the designation of the payment method during the commodity registration. Further, for example, the accounting destination selection module 12 may display the payment method selection screen 1071 at the timing at which the closing key is operated, to receive the designation of the payment method during a period before the registration processing is completed.

The payment information generation module 13 generates payment information used for payment processing in the payment apparatus 20 on the basis of the sales data registered during one transaction. Specifically, when the end of the commodity registration is instructed via the operation device 108, the payment information generation module 13 generates payment information on the basis of the sales data registered before such an instruction is performed.

Here, the payment information includes a transaction ID with which each transaction can be identified. Specifically, the payment information generation module 13 assigns a transaction ID, with which each transaction can be identified, to a transaction for each transaction, and includes the transaction ID in the payment information. Further, the payment information includes at least information with which a total amount obtained by totaling the amounts of the commodities purchased by the customer can be specified. For example, the payment information generation module 13 may include, in the payment information, a total amount obtained by multiplying the unit price of the commodity included in each piece of the sales data by the number of purchases. Further, the payment information generation module 13 may include the payment method received by the accounting destination selection module 12 in the payment information.

The output processing module 14 is an example of output means. The output processing module 14 outputs the payment information generated by the payment information generation module 13. Specifically, the output processing module 14 performs output processing for delivering the payment information of the commodity registered in the commodity registration module 11 to the payment apparatus 20 selected by the accounting destination selection module 12 in response to the instruction to terminate the commodity registration.

For example, in the case of the configuration in which the payment information is directly transmitted from the registration apparatus 10 to the payment apparatus 20, the output processing module 14 outputs (transmits) the payment information to the payment apparatus 20 selected by the accounting destination selection module 12. Further, for example, in the case of the configuration in which the payment information is provided to the payment apparatus 20 via the server apparatus 30, the output processing module 14 transmits the payment apparatus ID of the payment apparatus 20 selected by the accounting destination selection module 12 to the server apparatus 30 together with the payment information generated by the payment information generation module 13. Further, for example, in the case of the configuration in which the payment apparatus 20 reads the payment information and the transaction ID coded into a code symbol, the output processing module 14 outputs the code symbol coded while including the payment apparatus ID of the payment apparatus 20 selected by the accounting destination selection module 12. In this case, the code symbol may be output from a printer device (not shown) connected to the registration apparatus 10. Note that the code symbol is a bar code or a two-dimensional code, for example.

In addition, the output processing module 14 associates the payment method received by the accounting destination selection module 12, the payment apparatus ID of the payment apparatus 20 selected by the accounting destination selection module 12, and the transaction ID given by the payment information generation module 13 with each other in response to an instruction to terminate the commodity registration, and transmits the allocation notification to the server apparatus 30. As a result, the controller 300 of the server apparatus 30 associates the payment method and the transaction ID transmitted from the registration apparatus 10 with each other, and registers them in the "reservation status" column of the corresponding payment apparatus ID in the payment apparatus management file 3504.

Figure 8:
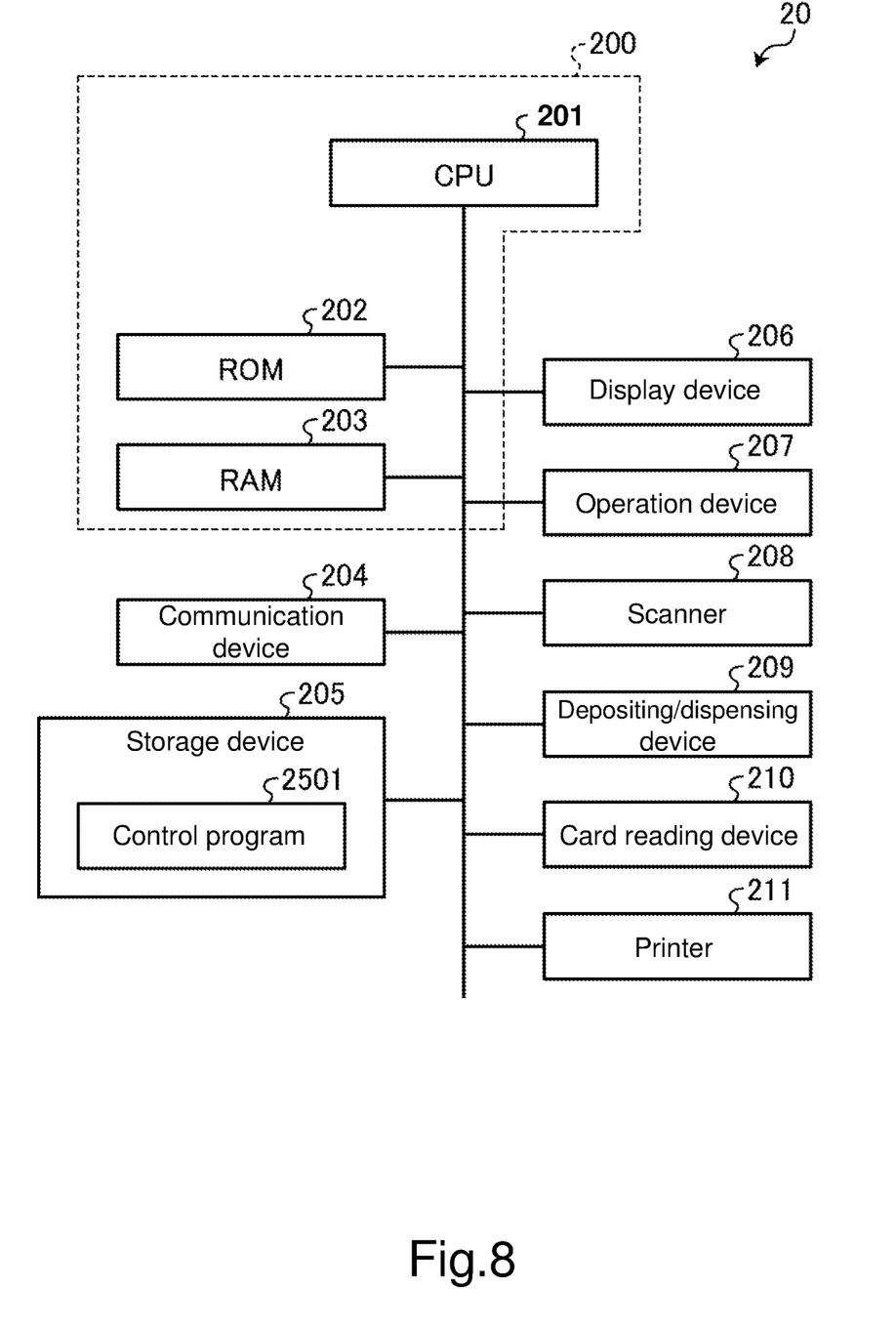
FIG. 8 is a diagram showing an example of a hardware configuration of the payment apparatus according to the embodiment.

Next, the configuration of the payment apparatus 20 will be described. FIG. 8 is a diagram showing an example of the hardware configuration of the payment apparatus 20. As shown in FIG. 8, the payment apparatus 20 includes a CPU 201, a ROM 202, and a RAM 203.

The CPU 201 is an exemplary processor and comprehensively controls the operation of the payment apparatus 20. The ROM 202 stores various programs. The RAM 203 is a workspace for expanding programs and various types of data. The CPU 201, the ROM 202, and the RAM 203 are connected to each other via a bus or the like to form a controller 200 of the computer. In the controller 200, the CPU 201 executes various types of processing by operating in accordance with a control program 2501 stored in the ROM 202 or a storage device 205 and expanded in the RAM 203.

The controller 200 is connected to a communication device 204 and the storage device 205 via a bus or the like. The communication device 204 is a communication interface connectable to the network 50. The communication device 204 communicates with external apparatuses such as the registration apparatus 10 and the server apparatus 30 via the network 50.

The storage device 205 includes an HDD, a flash memory, and the like and maintains stored contents even when the power is turned off. The storage device 205 stores, for example, the control program 2501. The control program 2501 is a control program for controlling the operation of the payment apparatus 20. Note that the storage device 205 may store the above-mentioned commodity master 3502 provided from the server apparatus 30, and the like.

Further, the controller 200 is connected to a display device 206, an operation device 207, a scanner 208, the depositing/dispensing device 209, a card reading device 210, a printer 211, and the like via a bus or the like.

The display device 206 is a display device such as a touch panel. The display device 206 displays various images under the control of the controller 200. The operation device 207 includes various operation buttons, and outputs key information corresponding to an operation of the operator to the controller 200. The operation device 207 may include a touch panel provided to the display device 206.

The scanner 208 is a reading device capable of reading a code symbol such as a bar code or a two-dimensional code. For example, the scanner 208 reads a code symbol for electronic payment (code payment) represented on a paper medium, a customer terminal, or the like and outputs the read result to the CPU 201.

The depositing/dispensing device 209 receives cash (bills or coins) inserted into a money depositing port (not shown), and separates and stores the cash for each denomination. Further, the depositing/dispensing device 209 pays out change from a dispensing port (not shown) under the control of the controller 200. Note that if the payment apparatus 20 is exclusive for electronic payment, the payment apparatus 20 may exclude the depositing/dispensing device 209.

The card reading device 210 is a reading device that reads information from a card medium. For example, the card reading device 210 reads information relating to electronic payment from a card medium such as a credit card or an electronic money card.

The printer 211 is a printing device such as a thermal printer. Under the control of the controller 200, the printer 211 prints a receipt indicating the contents of a transaction at the end of the payment processing.

In the configuration of the payment apparatus 20 described above, the controller 200 implements various types of processing and functions by cooperating with the control program 2501.

For example, the controller 200 executes the payment processing for commodities on the basis of the payment information of the commodities in one transaction registered by the registration apparatus 10. In this case, the payment information includes at least information capable of specifying the breakdown of each registered commodity and the total amount. For example, the payment information may include the commodity code of each registered commodity and the number of purchases thereof, or may include part or all of the commodity information. In addition, the payment information includes a transaction ID with which a transaction relating to the payment information can be specified, and a payment method selected at the time of registration. Note that the transaction ID and the payment method may be attached to the payment information as information independent of the payment information.

The payment information may be obtained in a variety of ways. For example, if the payment information is directly transmitted from the registration apparatus 10 to the payment apparatus 20, the controller 200 acquires the payment information transmitted to its own payment apparatus 20. In this case, the payment apparatus 20 may notify the server apparatus 30 of the transaction ID and payment method included in the acquired payment information as the allocation notification.

For example, when the payment information is transmitted from the registration apparatus 10 to the server apparatus 30, the controller 200 acquires the payment information allocated to its payment apparatus 20 from the server apparatus 30. In this case, the controller 200 may transmit the transaction ID input through the operation device 207, the scanner 208, or the like to the server apparatus 30 as the payment processing start notification.

For example, if the payment information is output in the form of a code symbol, the controller 200 may acquire the payment information from the code symbol via the scanner 208.

Further, when starting the payment processing on the basis of the payment information, the controller 200 notifies the server apparatus 30 of the transaction ID included in the payment information as the payment processing start notification. Note that when an error is transmitted from the server apparatus 30 as a response to the start notification, the controller 200 causes the display device 206 to display a message indicating that the payment apparatus 20 as the accounting destination is different. Further, when the payment apparatus ID is transmitted as an error from the server apparatus 30, the controller 200 causes the display device 206 to display a message indicating the position or the like of the payment apparatus 20 corresponding to the payment apparatus ID as a correct accounting destination.

Further, when starting the payment processing on the basis of the payment information, the controller 200 executes the payment processing of paying the total amount of the commodities by the payment method included in the payment information. For example, if the payment method is cash payment, the controller 200 executes payment processing on the basis of the amount of money deposited in the depositing/dispensing device 209, and instructs the depositing/dispensing device 209 to dispense the change as necessary. Further, for example, if the payment method is electronic payment, the controller 200 executes payment processing on the basis of the information relating to electronic payment input via the scanner 208 or the card reading device 210. Note that if the configuration in which the payment method is notified from the server apparatus 30, the payment processing may be executed using the notified payment method.

When the payment processing is completed, the controller 200 causes the printer 211 to print a receipt on which the transaction content is printed, and transmits the transaction ID included in the payment information for which the payment processing has been completed, as a payment processing completion notification, to the server apparatus 30.

The checkout system 1 of this embodiment is provided by the registration apparatus 10, the payment apparatus 20, and the server apparatus 30 described above. Specifically, after the payment information of the commodities registered by the registration apparatus 10 is delivered to the payment apparatus 20 selected by the registration apparatus 10, the payment processing is executed on the basis of the delivered payment information by the payment method desired by the customer in the payment apparatus 20. Further, the status of each payment apparatus 20 is collectively managed by the server apparatus 30 and is referred to when the registration apparatus 10 performs processing of selecting an accounting destination.

Figure 9:
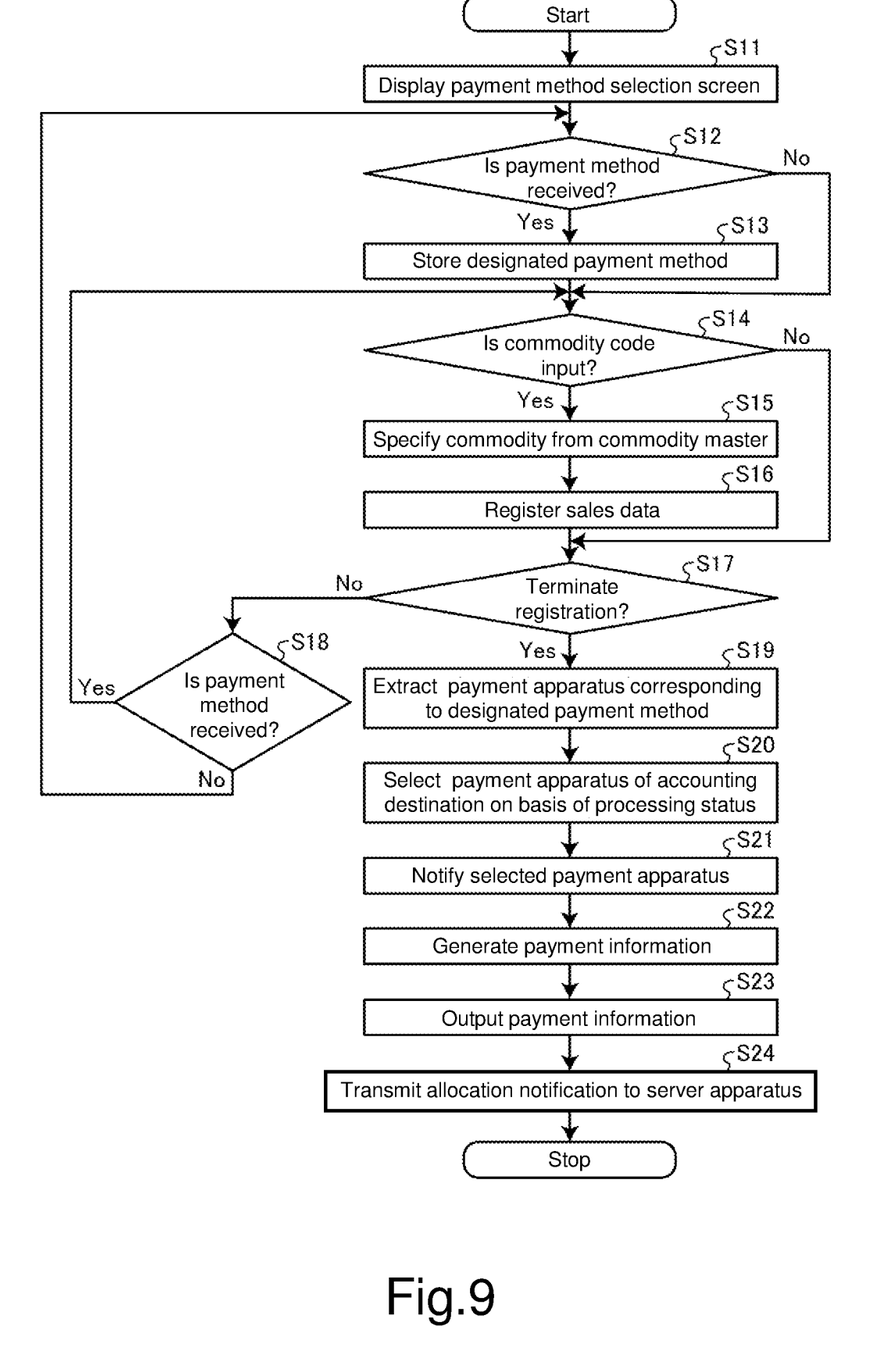
FIG. 9 is a flowchart showing an example of processing executed by the registration apparatus according to the embodiment.

An example of the operation of the registration apparatus 10 described above will be described below. FIG. 9 is a flowchart showing an example of the processing executed by the registration apparatus 10.

First, in the registration apparatus 10, when the registration processing is started by an operation of a clerk or the like, in Step S11, the accounting destination selection module 12 of the controller 100 causes the customer display device 107 to display the payment method selection screen 1071 (see FIG. 7). Next, in Step S12, the accounting destination selection module 12 determines whether or not a designation of the payment method is received via the payment method selection screen 1071. If the designation of the payment method is not received (Step S12; No), the processing of the controller 100 proceeds to Step S14. If the designation of the payment method is received (Step S12; Yes), the processing of the controller 100 proceeds to Step S13. In Step S13, the accounting destination selection module 12 of the controller 100 stores the designated payment method in the RAM 103 or the like. Subsequently, the processing of the controller 100 proceeds to Step S14. Note that the customer display device 107 may delete the payment method selection screen 1071 or switch to another screen at the timing at which the designation of the payment method is received.

Subsequently, in Step S14, the commodity registration module 11 of the controller 100 determines whether or not a commodity code is input via the scanner 208. If a commodity code is not input (Step S14; No), the processing of the controller 100 proceeds to Step S17.

If a commodity code is input (Step S14; Yes), the processing of the controller 100 proceeds to Step S15. In Step S15, the commodity registration module 11 of the controller 100 specifies a commodity corresponding to the input commodity code on the basis of the commodity master 3502. Next, in Step S16, the commodity registration module 11 of the controller 100 registers the sales data including the commodity name, the unit price, the number, and the like of the specified commodity in the RAM 103 or the like. Subsequently, the processing of the controller 100 proceeds to Step S17.

Subsequently, in Step S17, the controller 100 determines whether or not an instruction to terminate the commodity registration is received via the operation device 108 or the like. If the instruction to terminate the registration is not received (Step S17; No), the processing of the controller 100 proceeds to Step S18. In Step S18, the controller 100 determines whether or not the payment method is received by checking the stored state of the payment method in the RAM 103. In this case, if the controller 100 determines that the payment method is not received because the payment method is not stored (Step S18; No), the processing of the controller 100 returns to Step S12. Further, if the controller 100 determines that the payment method is received because the payment method is stored (Step S18; Yes), the processing of the controller 100 returns to Step S14.

On the other hand, if the instruction to terminate the registration is received (Step S17; Yes), the processing of the controller 100 proceeds to Step S19. In Step S19, the accounting destination selection module 12 of the controller 100 refers to the payment apparatus management file 3504 and extracts a payment apparatus 20 corresponding to the payment method stored in Step S13. Next, in Step S20, the accounting destination selection module 12 selects the payment apparatus 20 to be an accounting destination on the basis of the status of the extracted payment apparatus 20 (information in the "current status" and "reservation status" columns) or the like. Next, in Step S21, the accounting destination selection module 12 causes the clerk display device 106 and the customer display device 107 to display a screen for notifying the selected payment apparatus 20.

Subsequently, in Step S22, the payment information generation module 13 of the controller 100 generates payment information for one transaction on the basis of the sales data and the like registered in the RAM 103 and the like. Note that the payment information generation module 13 may include the payment method stored in Step S13 and the payment apparatus ID of the payment apparatus 20 selected in Step S20 in the payment information.

Subsequently, in Step S23, the output processing module 14 of the controller 100 transmits the payment information generated in Step S22 to the payment apparatus 20 to be the accounting destination on the basis of the selection result in Step S20. In Step S24, the output processing module 14 transmits an allocation notification including the payment method stored in Step S13, the payment apparatus ID of the payment apparatus 20 selected in Step S20, and the transaction ID of the current transaction to the server apparatus 30, and terminates the processing.

Note that in the above processing the accounting destination selection module 12 of the controller 100 selects the payment apparatus 20 of the accounting destination after the operation to terminate the registration, but the present invention is not limited to this. The payment apparatus 20 of the accounting destination may be selected at the timing at which the designation of the payment method is received.

As described above, the registration apparatus 10 according to this embodiment is a registration apparatus that constitutes the checkout system 1 together with the payment apparatus 20, and registers commodities to be purchased by a customer and receives a designation of a payment method desired by the customer. In addition, the registration apparatus 10 selects the payment apparatus 20 to be the accounting destination from the payment apparatuses 20 corresponding to the received payment method, and performs output processing for delivering the payment information to the selected payment apparatus 20. As a result, the registration apparatus 10 can select the payment apparatus to be the accounting destination in consideration of the payment method desired by the customer, so that the payment apparatus can be efficiently selected.

Further, the registration apparatus 10 selects a payment apparatus to be a payment destination on the basis of the processing status of the payment apparatus 20 and the payment method of the payment processing being executed or scheduled to be executed by the payment apparatus 20. As a result, in the checkout system 1, the payment processing performed in the payment apparatus 20 can be efficiently advanced, so that it is possible to shorten the waiting time required for accounting and to improve the processing efficiency of the entire checkout system 1 eventually.

Note that the embodiment described above can also be implemented by appropriately modifying a part of the configuration or function of each of the apparatuses described above. Therefore, in the following, some modifications according to the embodiment described above will be described as other embodiments. Note that in the following description points different from the embodiment described above will be mainly described. Specifically, the same reference numerals denote the points common to those already described, and detailed description thereof is omitted. Further, the modifications to be described below may be implemented individually or in combination as appropriate.

(Modification 1)

In the embodiment described above, a customer designates a payment method every time the customer purchases a commodity, but for example, the customer may skip the payment method designation operation by managing the designated payment method in association with user identification information with which the customer can be identified.

In the case of implementing the configuration according to this modification, for example, the member ID held in the member card can be used as the user identification information. Specifically, the accounting destination selection module 12 of the controller 100 transmits a registration request in which the member ID and the payment method are associated with each other to the server apparatus 30 when the designation of the payment method is received in a state where the member ID is read by the card reading device 110. Upon receiving the registration request from the registration apparatus 10, the server apparatus 30 stores the payment method in association with the corresponding member ID in the member master 3503. Subsequently, when the member ID is read by the card reading device 110 in the next and subsequent transactions, the accounting destination selection module 12 reads out the payment method corresponding to the member ID from the member master 3503 and receives the payment method. As a result, in this modification, it is possible to omit every designation operation of the payment method for the member who has once designated the payment method.

Note that the accounting destination selection module 12 of the controller 100 may display the payment method associated with the member ID (hereinafter, also referred to as the previous payment method) on the payment method selection screen 1071 (see FIG. 7), thereby allowing the customer to confirm whether to changes the payment method or not. In this case, if the payment method is newly designated from the payment method selection screen 1071, the accounting destination selection module 12 updates the previous payment method with the designated payment method. Further, if the payment method is not designated from the payment method selection screen 1071, the accounting destination selection module 12 selects the payment apparatus 20 of the accounting destination by using the previous payment method.

(Modification 2)

In the embodiment described above, the registration apparatus 10 is a stationary commodity-sales-data-processing apparatus installed in a store, but the present invention is not limited to such a form. For example, the registration apparatus 10 may be a portable terminal such as a smartphone owned by a customer, or a portable terminal such as a tablet terminal lent to a customer by the store.

In this case, the registration apparatus 10 may have the configuration similar to that of the registration apparatus 10 described in the above embodiment. Note that the registration apparatus 10 may include a single display device for the operator. Further, the scanner 109 may be externally attached as a separate unit or may cooperate with an imaging device included in the registration apparatus 10 to read a code symbol from an image captured by the imaging device. Further, the card reading device 110 may be externally attached as a separate unit or may be removed.

Further, the functional configuration of the registration apparatus 10 is also similar to that of the registration apparatus 10 described in the above embodiment. Note that the output processing module 14 of the controller 100 may cause the display device of its own apparatus to output the transaction ID, the payment information, and the like coded into a code symbol.

For example, in the case of the configuration in which payment information is transmitted from the registration apparatus 10 to the payment apparatus 20 or the server apparatus 30, the output processing module 14 of the controller 100 may cause the display device to output the coded transaction ID. In this case, the user (customer) of the registration apparatus 10 causes the scanner 208 of the payment apparatus 20 to read the code symbol displayed on the registration apparatus 10, whereby the payment information corresponding to the transaction ID can be read out by the payment apparatus 20.

Further, for example, if the payment information is transmitted to the payment apparatus 20 via the code symbol, the output processing module 14 of the controller 100 may cause the display device to output the coded payment information. In this case, the user (customer) of the registration apparatus 10 can transmit the payment information to the payment apparatus 20 by causing the scanner 208 of the payment apparatus 20 to read the code symbol displayed on the registration apparatus 10. In either case, the payment apparatus ID of the payment apparatus 20 selected by the accounting destination selection module 12 of the controller 100 may be included in the code symbol.

Further, if the registration apparatus 10 is a portable terminal such as a smartphone owned by the customer, a payment method designated once may be stored in the storage device 105 or the like, and the payment method may be used when an accounting destination is selected by the accounting destination selection module 12 of the controller 100. As a result, in this modification, it is possible to omit each designation operation of the payment method for the customer who has designated the payment method once.

Note that the accounting destination selection module 12 of the controller 100 may display the payment method stored in the storage device 105 or the like (hereinafter, referred to as the previous payment method) on the payment method selection screen 1071, thereby allowing the customer to confirm whether to changes the payment method or not. In this case, if the payment method is newly designated from the payment method selection screen 1071, the accounting destination selection module 12 updates the previous payment method with the designated payment method. Further, if the payment method is not designated from the payment method selection screen 1071, the accounting destination selection module 12 selects the payment apparatus 20 of the accounting destination by using the previous payment method.

(Modification 3)

In the embodiment described above, the server apparatus 30 collectively manages the statuses of the respective payment apparatuses 20, but the present invention is not limited to such a form. For example, a single registration apparatus 10 or a single payment apparatus 20 serving as a representative may be configured to collectively manage the statuses of the respective payment apparatuses 20. Further, for example, each of the payment apparatuses 20 may manage the status thereof and notify the registration apparatus 10 of the status in response to a request or the like from the registration apparatus 10. With such a configuration, it is possible to provide the effect similar to that in the embodiment described above.

Note that the program executed by each apparatus of the embodiment (and modifications) described above is provided in a state of being incorporated in advance in a ROM, a storage device, or the like. The program executed by each apparatus of the embodiment described above is a file in an installable format or executable format and may be provided by recording the program on a computer-readable recording medium such as a CD-ROM, a flexible disk (FD), a CD-R, a digital versatile disk (DVD), or the like.

In addition, the program executed by each apparatus of the embodiment described above may be provided by storing the program on a computer connected to a network such as the Internet and downloading it via the network. Further, the program executed by each apparatus of the embodiment described above may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A registration apparatus, which is included in a registration-payment-separate checkout system of a store including a plurality of payment apparatuses provided in the store separately from the registration apparatus for performing payment processing for a commodity purchased on a basis of payment information of the commodity purchased by a customer, and provides the payment information to one of the plurality of payment apparatuses for the payment processing with the customer, the registration apparatus comprising:
    a body;
    a storage device that stores management information of the plurality of payment apparatuses, the management information indicating: i) one or more payment methods that can be supported by each of the plurality of payment apparatuses; ii) a number of payment processing tasks assigned to each of the plurality of payment apparatuses; and iii) a distance from the registration apparatus to each of the plurality of payment apparatuses;
    an input device operable from a first side of the body to input a commodity code for specifying the purchased commodity during registration processing;
    a reception device operable from a second side of the body opposite to the first side to receive a designation of a payment method; and
    a controller configured to specify a commodity corresponding to the commodity code input by the input device and register sales data indicating contents relating to a transaction of the specified commodity, select a target payment apparatus that performs the payment processing for the purchased commodity in accordance with the designated payment method received by the reception device on a basis of the supported payment methods, the number of assigned payment processing tasks, and the distance to the registration apparatus included in the management information generate payment information of the purchased commodity on a basis of the registered sales data, and output the generated payment information to the target payment apparatus.

2. The registration apparatus according to claim 1, further comprising a reading device that inputs identification data for specifying the customer, wherein the controller further causes the storage device to store the designated payment method received by the reception device and the identification data of the customer input by the reading device in association with each other.

3. The registration apparatus according to claim 2, wherein the controller selects, when the reading device inputs the identification data of the customer, the target payment apparatus based on the payment method stored in the storage device in association with the input identification data of the customer.

4. The registration apparatus according to claim 1, wherein the controller extracts one or more payment apparatuses that support the designated payment method received by the reception device and selects the target payment apparatus from the extracted one or more payment apparatuses.

5. The registration apparatus according to claim 1, wherein the controller selects as the target payment apparatus a payment apparatus that is neither executing nor scheduled to execute payment processing in accordance with the designated payment method in priority over payment apparatuses that are executing or scheduled to execute payment processing in accordance with the designated payment method.

6. The registration apparatus according to claim 1, further comprising a display device, wherein the controller further causes the display device to display identification data of the target payment apparatus to notify an operator of the target payment apparatus.

7. The registration apparatus according to claim 6, wherein the display device includes a customer display device, and the controller further causes the customer display device to display a screen for guiding a position of the target payment apparatus.

8. The registration apparatus according to claim 1, wherein the reception device comprises a customer display on the second side of the body, and the controller is configured to control the customer display to display a payment method selection screen in response to the registration apparatus starting registration processing.

9. The registration apparatus according to claim 8, further comprising:

a clerk display on the first side of the body, wherein the controller is configured to control the clerk display to display an operation screen presenting a plurality of candidate payment apparatuses for the target payment apparatus, the plurality of candidate payment apparatuses being presented in an order of priority determined based on support of the designated payment method, the number of assigned payment processing tasks, and a distance from the registration apparatus, and select the target payment apparatus based on a user operation on the operation screen.

* * * * *